United States Patent [19]

Jakes

[11] 3,889,035

[45] June 10, 1975

[54] FIBER-REINFORCED PLASTIC ARTICLES

[75] Inventor: John Harry Jakes, Stamford, England

[73] Assignee: Marling Industries Limited, London, England

[22] Filed: Nov. 27, 1972

[21] Appl. No.: 309,617

[52] U.S. Cl. ............... 428/227; 28/72.2 R; 156/148; 428/435; 428/239; 428/251; 264/258

[51] Int. Cl. ... B32b 17/04; B32b 17/10; B32b 17/12

[58] Field of Search ...... 161/DIG. 4, 152, 154, 155, 161/156, 158, 166, 185, 194, 193, 200, 203, 232, 249, 406, 81, 85, 76, 89, 93, 95; 28/72.2 R; 156/148

[56] References Cited
UNITED STATES PATENTS

| | | | |
|---|---|---|---|
| 1,529,701 | 3/1925 | Hewitt | 28/72.2 R |
| 1,574,496 | 2/1926 | McDermott | 28/72.2 R |
| 2,339,431 | 1/1944 | Slayter | 161/DIG. 4 |
| 2,543,101 | 2/1951 | Francis | 161/85 |
| 2,577,205 | 12/1951 | Meyer et al. | 161/DIG. 4 |
| 2,794,759 | 6/1957 | Deldilian | 161/154 |
| 2,800,423 | 7/1957 | De Swart | 161/DIG. 4 |
| 2,805,181 | 9/1957 | Groff et al. | 161/DIG. 4 |
| 2,959,511 | 11/1960 | Finger | 161/DIG. 4 |
| 2,995,781 | 8/1961 | Sipler | 161/DIG. 4 |
| 3,210,230 | 10/1965 | Tyhurst | 161/DIG. 4 |
| 3,608,166 | 9/1971 | Grugel | 28/72.2 R |
| 3,684,284 | 8/1972 | Tranfield | 161/154 |
| 3,684,645 | 8/1972 | Temple et al. | 161/DIG. 4 |
| 3,713,962 | 1/1973 | Ackley | 156/148 |

*Primary Examiner*—George F. Lesmes
*Assistant Examiner*—J. Cannon
*Attorney, Agent, or Firm*—Lawrence E. Laubscher

[57] ABSTRACT

A mouldable sheet material consists of a mass of glass fiber-reinforced incompletely polymerized thermosetting resin, such as a polyester or epoxy resin, containing intermediately of the sheet a web of knitted glass-fiber fabric which controls the flow of the reinforcing fibers during moulding. There may be more than one knitted web, the webs being spaced from one another and from the sheet surface. The fibers nearer the surface may be of finer gauge than those deeper within the sheet. The two classes of fibers may be separated by a knitted web. Layers of different kinds may be held together by dispersed particles of thermoset resin or by threads drawn through by needling. A strippable protective layer may be applied to one or both faces of the sheet.

12 Claims, 8 Drawing Figures

3,889,035

FIBER-REINFORCED PLASTIC ARTICLES

BACKGROUND OF THE INVENTION

This invention relates to improvements in mouldable sheet materials and is particularly concerned with glass fiber reinforced thermosetting resin materials in sheet form.

A known method of producing moulded plastics articles reinforced with fibers is to place in a mould a sheet of moulding compound consisting of a mixture of thermosetting plastics material and shopped strand mat, rovings or other relatively short lengths of fiber to be used for reinforcement. When pressed in a matched tool mould the moulding compound may flow in such a manner that a great majority of the reinforcing fibers align themselves in the direction of flow and the resultant mouldings then have little more than the strength of the plastics bonding material in the direction transverse to that of flow, in which the fibers have become aligned.

SUMMARY OF THE INVENTION

It is an object of the present invention to provide a mouldable fiber-reinforced sheet material in which undesired alignment of reinforcing fibers resulting from flow during moulding is reduced or prevented.

It is a further object of the invention to provide a mouldable sheet of fiber-reinforced resin material comprising a flow-controlling textile web which web may readily be caused to assume the desired shape of an article to be moulded.

It is an additional objection of the invention to provide a mouldable sheet of fiber-reinforced thermosetting resin having a knitted glass fiber flow-controlling web intermediately of the sheet and having reinforcing fibers adjacent a surface of the sheet which are finer than fibers elsewhere within the sheet.

It is yet another object of the invention to provide a mouldable sheet of fiber-reinforced thermosetting resin having a flow-controlling web of knitted glass fiber intermediate the sheet and having a strippable protective layer on one at least of the surfaces of the sheet.

In an embodiment of the invention a mouldable sheet material comprises a mass of incompletely polymerized thermosetting resin containing randomly arranged glass fibers and including a continuous web of knitted glass fiber fabric from the surface of the sheet.

It is an advantage of the invention that the knitted fabric may be so as readily to assume the desired shape of an article to be moulded. By reason of the loop formation used in knitting the fabric can be given a desired degree of stretch in more than one direction and the degrees of stretch may or may not be the same.

Accompanying this specification are drawings showing several illustrative embodiments of the invention wherein.

Figure 1:
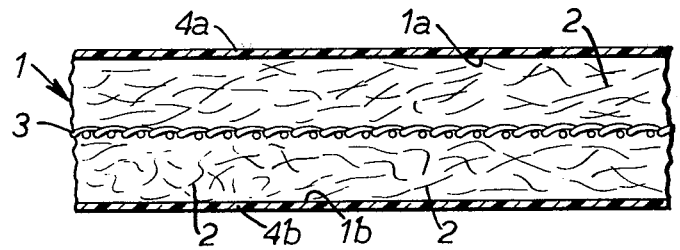
FIG. 1 is a cross-section through a moldable sheet material comprising a mass of incompletely polymerized thermosetting resin which contains a continuous web of knitted fibrous material and short reinforcing fibers.

FIG. 1 shows a cross-section through a portion of the simplest form of mouldable sheet material in accordance with the invention, comprising a laminar mass or sheet 1 of incompletely polymerized polyester, epoxy or other thermosetting resin. The resin may be in the form of finely ground resin particles, or may be in quasi-liquid form. Randomly dispersed throughout the resin mass 1 are short glass fibers 2. Within the sheet or mass 1 of fiber-containing resin and spaced from the surfaces 1a, 1b of the sheet is a continuous web 3 of knitted glass-fiber material. The presence of the knitted web 3 serves to control the flow of the mouldable material, preventing unwanted alignment of the reinforcing fibers in a single direction and resultant weakening of the material when moulded.

It is an advantage of the invention that the knitted web may be made so as readily to assume the desired shape of an article to be moulded. By reason of the loop formation used in knitting the web can be given desired degrees of stretch in more than one direction and the degrees of stretch may or may not be the same.

A fiber-reinforced plastics sheet in which a knitted glass fiber web is provided to control flow of short glass reinforcing fibers may be used as an inner or an outer component of a glass-resin composite laminate. Preferably the knitted glass-fiber web is formed by warp knitting, though a weft-knitted material can be used in cases where this manner of manufacture will produce the required form of web.

It is possible and will often be desirable to apply a layer of impregnated and fiber-reinforced resin material between outer layers of deformable plastics material, or to apply layers containing glass-fiber flow-control webs alternately with reinforced or unreinforced layers of resin until a desired thickness is attained.

It will usually be advantageous to provide at least one surface of the mouldable sheet material with a layer 4a, 4b of a strippable material which serves to prevent contamination of the surface and to prevent unwanted adhesion to other materials before use. the strippable layer may be polythene film or a layer of polyvinyl alcohol, reconstituted cellulose or may be a paper layer coated on its surface to be applied to the resin mass with one of these materials.

A suitably sized portion of a sheet of mouldable material as described above with reference to FIG. 1 may be stripped of its protective layers (if any) and placed in a mould where it is formed to a desired shape by a die or by an inflated bag and is then cured, as by heating, to yield a strong article of the required shape. Curing is best effected while the mouldable material is held to the required shape in the mould or is otherwise under pressure or constrained to the required shape.

Figure 2:
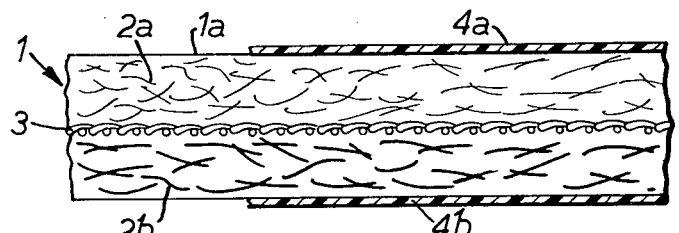
FIG. 2 is a variation of the moldable sheet material of FIG. 1 wherein the short reinforcing fibers adjacent opposed sides of the knitted web are characterized by a different respective coarseness.

FIG. 2 shows another embodiment of mouldable material in which a laminar mass or sheet 1 of unpolymerized or incompletely polymerized polyester, epoxy or other thermosetting resin again is provided with a knitted web 3 of glass-fiber material to control flow of the material and prevent alignment of reinforcing glass fibers 2a, 2b randomly dispersed within the resin mass. In this case, however, the reinforcing fibers 2a on one side of knitted web 3 are finer, that is, of less diameter, than the coarser fibers 2b on the other side of the web 3. This arrangement is advantageous in permitting the surface 1a of the sheet 1 which is to form the outer or viewed surface of an article to be moulded from the sheet to be of high surface finish while the presence of the coarser fibers increases the strength of the article.

An advantage obtained by this embodiment of the present invention is that in order to obtain a desired quality of surface finish it is necessary to set a limit to the maximum percentage of the reinforcing fibrous strands used in the moulding material. If the material is of uniform consistency throughout, save for the interior knitted layer of flow-controlling fibrous material, the strength of the moulded article will, for a given thickness, be reduced if the amount of reinforcing fiber is reduced to obtain improved surface finish. Only the actual surface layer need be of different fiber content, and even in this layer the proportion of fiber need not always be reduced so that a desired quality of surface finish can be obtained with a substantially increased total content of reinforcing fibers. The thickness of the moulded article to obtain a given strength may thus be reduced as compared with an article of the same strength and surface finish made from a moulding material of uniform composition throughout.

Figure 3:
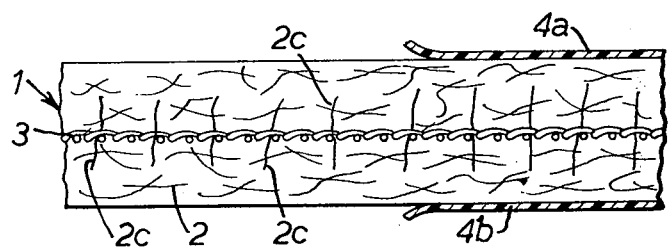
FIG. 3 is a variation of the moldable sheet material of FIG. 1 wherein some of the short reinforcing fibers are drawn through the knitted web.

FIG. 3 shows another embodiment of mouldable sheet material in accordance with the invention in which some of the reinforcing fibers 2c are drawn through the knitted web 3 in order to improve the control of the flow of the resin mass 1 with its randomly dispersed reinforcing fibers 2. This effect may be produced by needling after the mass of reinforcing fibers 2 has been applied to either side of the knitted web 3 and before the resin has been incorporated in the mass.

Figure 4:
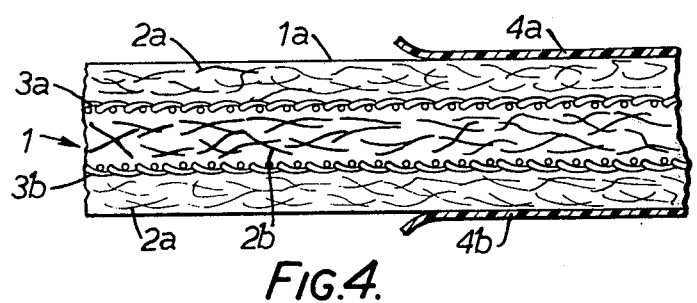
FIG. 4 is a variation of the moldable sheet material of FIG. 1 wherein the mass of incompletely polymerized thermosetting resin contains two webs of knitted fibrous material and laminar zones formed by the knitted webs are characterized by short reinforcing fibers having different coarseness in respective zones.

FIG. 4 shows yet another embodiment of mouldable sheet material in accordance with the invention, in which two webs 3a, 3b of knitted glass fiber material are spaced apart within the thickness of the mass 1 of incompletely polymerized resin material. In this case it may be advantageous to use coarser reinforcing fibers 2b in the part of the mass 1 between the two knitted webs 3a, 3b and finer reinforcing fibers 2a in the portion of the mass between the knitted webs 3a, 3b and the respective surfaces 1a, 1b of the sheet or mass 1.

Figure 5:
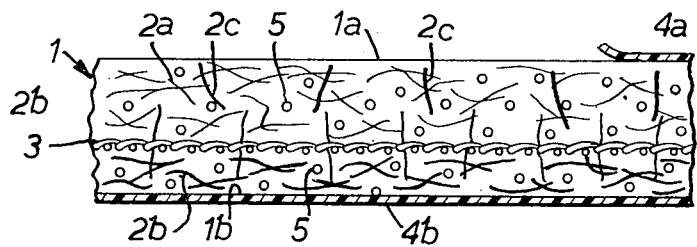
FIG. 5 is a variation of the moldable sheet material of FIG. 1 wherein the short reinforcing fibers adjacent the opposed faces of the knitted web are coarse relative to short reinforcing fibers more remote from one major face of the knitted web.

FIG. 5 shows a further embodiment of mouldable sheet material again comprising a mass of sheet 1 of incompletely polymerized resin in which is disposed a flow-controlling knitted glass-fiber web 3. In this case the portion of the mass 1 between the web 3 and the face 1b of the mass contains randomly dispersed coarser glass fibers 2b, while the portion of the mass between web 3 and the other face 1a of the mass contains coarser reinforcing fibers 2b adjacent the web and finer fibers 2a adjacent the face. As in the preceding embodiments, strippable layers 4a, 4b may be provided on one or both faces.

It is advantageous to provide the reinforcing fibers 2a for the surface layer in the form of a fiber bat, that is, a loose felt of fibers bonded by the layering of the fibers in random configuration. This bat may be secured to the underlying base component by resin bonding, using for example a ground polyester resin powder 5 of some 300 mesh, which is sprinkled on the assembled fibers and heat set, or by spraying the fibers and web with a polyester resin dissolved in a volatile solvent.

This means of securing the fibers and web may be adopted in all embodiments. Alternatively, the bat may be secured to the underlying coarser reinforcing fibrous material by the process of needling, that is, by piercing the layers of fibrous material by an array of hooked needles, so that some strands 2c of the bat are drawn into the underlying layer of coarser fibers 2b to hold the layers together. The same operation will secure the coarser fibers 2b to the flow-controlling knitted web 3 of glass fiber material and may be employed in all embodiments.

Figure 6:
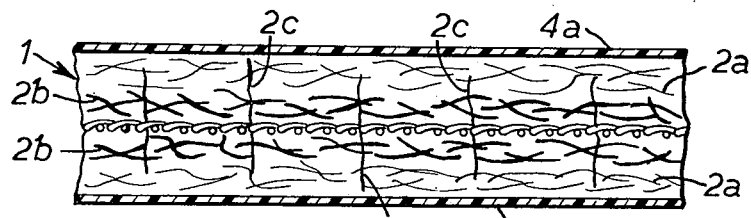
FIG. 6 is a cross-section through a moldable sheet impregnated with thermosetting resin powder comprising a continuous web of knitted fibrous material having a bat of coarse reinforcing fibers adjacent each major face thereof, a mat of relatively fine fibers adjacent the outer surface of each bat, and fibers pulled through the knitted web, holding the sheet material together.

The embodiment of the invention which is illustrated by FIG. 6 comprises a cental web 3 of knitted glass fiber having adjacent each of its surfaces a layer of discontinuous glass fiber reinforcing material 2b, formed by a bat of coarse fibers. Upon the outer surface of each coarse fiber bat 2b is placed a mat of finer discontinuous glass fibers such as a mat of chopped rovings. The whole is held together in this instance by fibers 2c which are pulled through the layers by a needling process as described below in relation to FIG. 7. The whole is impregnated with thermosetting resin powder denoted generally by 1.

Figure 7:
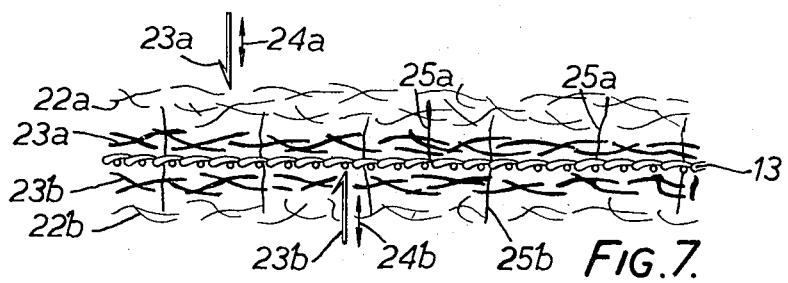
FIG. 7 shows the manner in which the moldable sheet material of FIG. 6 may be made.

FIG. 7 illustrates the manner in which the various layers of the embodiment of FIG. 6 may be held together by a needling process. The assembly of a lower mat of finer glass fibers 22b carrying a bat of coarser glass fibers 23b, a layer of flowcontrolling knitted glass fibers material 13 a further bat of coarser glass fibers 23a and a final mat of finer glass fibers 22a is pierced by hooked needles 23a, 23b, moving as indicated by arrows 24a, 24b. Each needle, of which there will be many, each arranged to penetrate the fiber assembly at a different point of its width, will be reciprocated far enough to draw through the thickness of the fiber layers sufficient strands to lock the layers together, as indicated at 25a, 25b.

Figure 8:
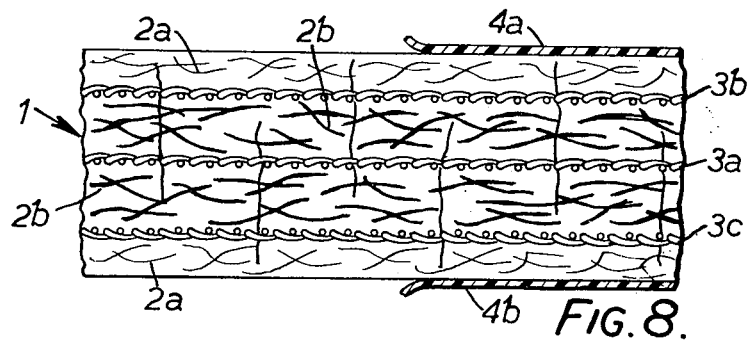
FIG. 8 is a variation of the moldable sheet material of FIG. 6 wherein a knitted fibrous web is disposed between each coarse fiber bat-fine fiber mat interface.

FIG. 8 illustrates yet another embodiment of the invention including three layers of flow-controlling knitted glass fiber web, 3a, 3b, 3c. Web 3a is disposed centrally within the thickness of the sheet and has on either surface thereof a layer or bat of coarser glass fibers 2b. Against this layer of coarser fibers is placed a further web of knitted glass fibers 3b, 3c and this in turn is followed by a mat of finer glass fibers 2a. The whole is impregnated with finely ground thermosetting resin 1, as in the preceding embodiments. Strippable layers 4a, 4b are preferably applied to at least one of the outer surfaces of the sheet.

I claim:

1. A moldable sheet material, comprising
   a. a mass of incompletely polymerized thermosetting resin;
   b. at least one continuous web of stretchable glass fiber knitted fabric contained within and extending longitudinally of said resin mass;
   c. first layers of randomly arranged glass fibers disposed on opposite sides of said fabric, respectively, for spacing said fabric from the major faces of said sheet material; and
   d. a plurality of reinforcing glass fibers passing through said fabric with the ends of said reinforcing fibers locked in normal arrangement to the glass fiber layer surfaces, thereby to secure together said glass fiber layers.

2. The material claimed in claim 1 wherein two webs of knitted glass fiber fabric are respectively interposed between opposed faces of a layer of coarser glass fibers and respective layers of finer glass fibers.

3. The material claimed in claim 1 wherein a web of knitted glass fiber fabric is disposed between two layers of coarser glass fibers and a layer of finer glass fibers is interposed between one at least of said layers of coarser fibers and a surface of the sheet.

4. The material claimed in claim 3 wherein a layer of finer glass fibers is interposed between each of said layers of coarser glass fibers and the respective surface of the sheet.

5. The material claimed in claim 1 wherein a web of knitted glass fiber fabric disposed centrally within said sheet has on either side thereof a layer of coarser glass fibers, a further web of knitted glass fiber fabric and a layer of finer glass fibers.

6. The material claimed in claim 1 and having a strippable protective layer applied to one or to both surfaces thereof.

7. The product defined in claim 1, wherein said sheet material includes at least two layers of said glass fiber web separated by a layer of randomly arranged glass fibers.

8. A material as defined in claim 1, and further including adjacent at least one major face of the sheet material a second layer of randomly arranged glass fibers which are finer than the fibers of said first layer.

9. A material as defined in claim 1, and further including a layer of strippable protective material applied to a major face of said sheet material.

10. A mouldable sheet material in accordance with claim 9 and having a strippable protective layer applied to each surface thereof.

11. A mouldable sheet material in accordance with claim 9 wherein said strippable layer presents to said material a surface of polyethylene, regenerated cellulose or polyvinyl alcohol.

12. A material as defined in claim 1, wherein the fibers of one of said first layers are coarser than the fibers of the other of said first layers.

* * * * *